Dec. 13, 1949 J. M. ALTHOUSE ET AL 2,490,768
RADIO REMOTE CONTROL SYSTEM
Filed April 26, 1946 3 Sheets-Sheet 1

INVENTORS
JAMES M. ALTHOUSE
MARGARET A. McADAMS
By William D. Hall.
ATTORNEY

INVENTOR
JAMES M. ALTHOUSE
MARGARET A. McADAMS
By William D. Hall
ATTORNEY

Dec. 13, 1949    J. M. ALTHOUSE ET AL    2,490,768
RADIO REMOTE CONTROL SYSTEM

Filed April 26, 1946    3 Sheets-Sheet 3

INVENTOR
JAMES M. ALTHOUSE
MARGARET A. McADAMS
BY
William D. Hall
ATTORNEY

Patented Dec. 13, 1949

2,490,768

UNITED STATES PATENT OFFICE 2,490,768

RADIO REMOTE-CONTROL SYSTEM

James M. Althouse, Dayton, Ohio, and Margaret A. McAdams, Minneapolis, Minn., assignors to United States of America as represented by the Secretary of War Application April 26, 1946, Serial No. 665,035

1 Claim. (Cl. 250—2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a remote control radio system and more particularly to remote control means for directing the course of flight of a controlled aircraft.

An object of the present invention is to provide an improved means for remote control of a controlled aircraft by means of radio link between the control station and the controlled aircraft.

Another object is to provide a remote control flight system that provides a rate of control of the aircraft that is as rapid in operation as is consistent with sound aerodynamic principles in high speed aircraft and that is as accurate and infallible as are the components therein.

A further object of the present invention is to provide a linkage between any suitable type of transmitter-receiver communication system of the aforesaid character that is operable from a control station for actuating the azimuth and elevation controls of the controlled aircraft that is flying preferably at a uniform speed.

The above objects of the present invention are augmented by additional objects that appear herein and which will be apparent to those who are informed in the field of remote control flight systems from the following description of an illustrative embodiment of the present invention that is shown in the accompanying drawings, wherein.

Figure 1:
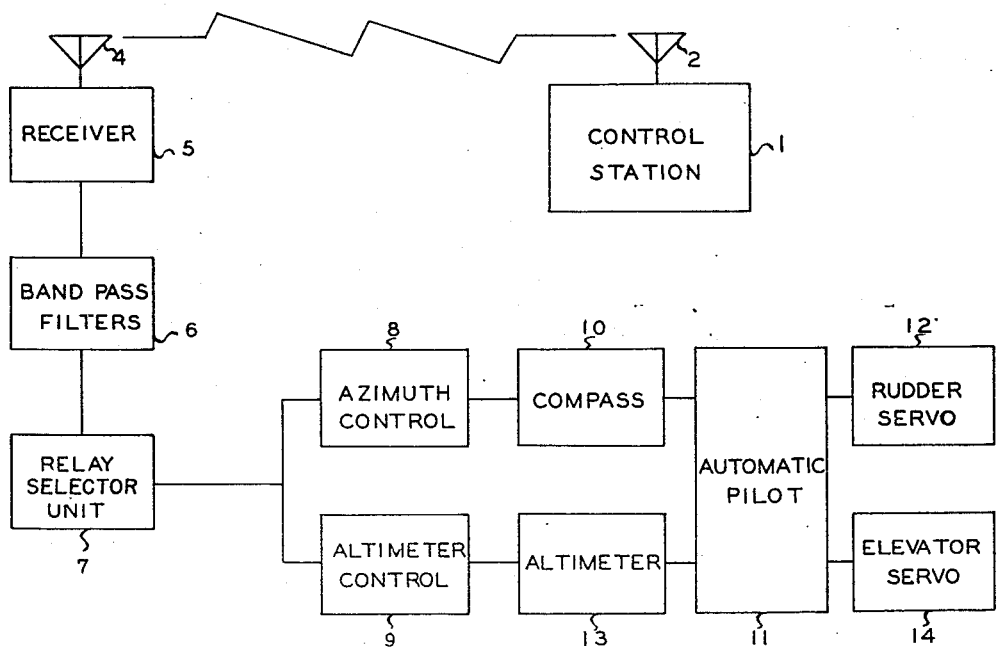
Fig. 1 is a block diagram of the present overall system showing a control station and a controlled station that may be disposed within the controlled aircraft.

The remote control radio system that forms the subject matter of the present invention comprises broadly a control station 1, Fig. 1, that is provided with a signal transmitting antenna 2 and a controlled station in the controlled aircraft, not shown, wherein a receiving antenna 4 intercepts signal from the signal transmitting antenna 2 and feeds it through a receiver 5 to a desired plurality or bank of band-pass filters 6 generally indicated in Fig. 1. The plurality of band-pass filters 6 channel received signals to a relay selector unit 7. The relay selector unit 7 applies its channeled output to a desired plurality of control channels, such as a pair of channels in azimuth control 8 that respectively cause the controlled aircraft to turn to the right or left, a pair of channels in an altitude control 9 that respectively cause the controlled aircraft to increase or decrease its elevation, and such other controls as may be desired.

In response to received signals the azimuth control 8, through a compass 10 and through an automatic pilot 11, causes the operation of a rudder servo 12 that operates a rudder, not shown, on the controlled aircraft to alter its course toward the right or left in azimuth. The altimeter control 9, in a similar manner and in response to received signals and through the altimeter 13 and automatic pilot 11, causes an elevator servo 14 to operate an elevator, not shown, on the controlled aircraft to alter its course in elevation.

Figure 2:
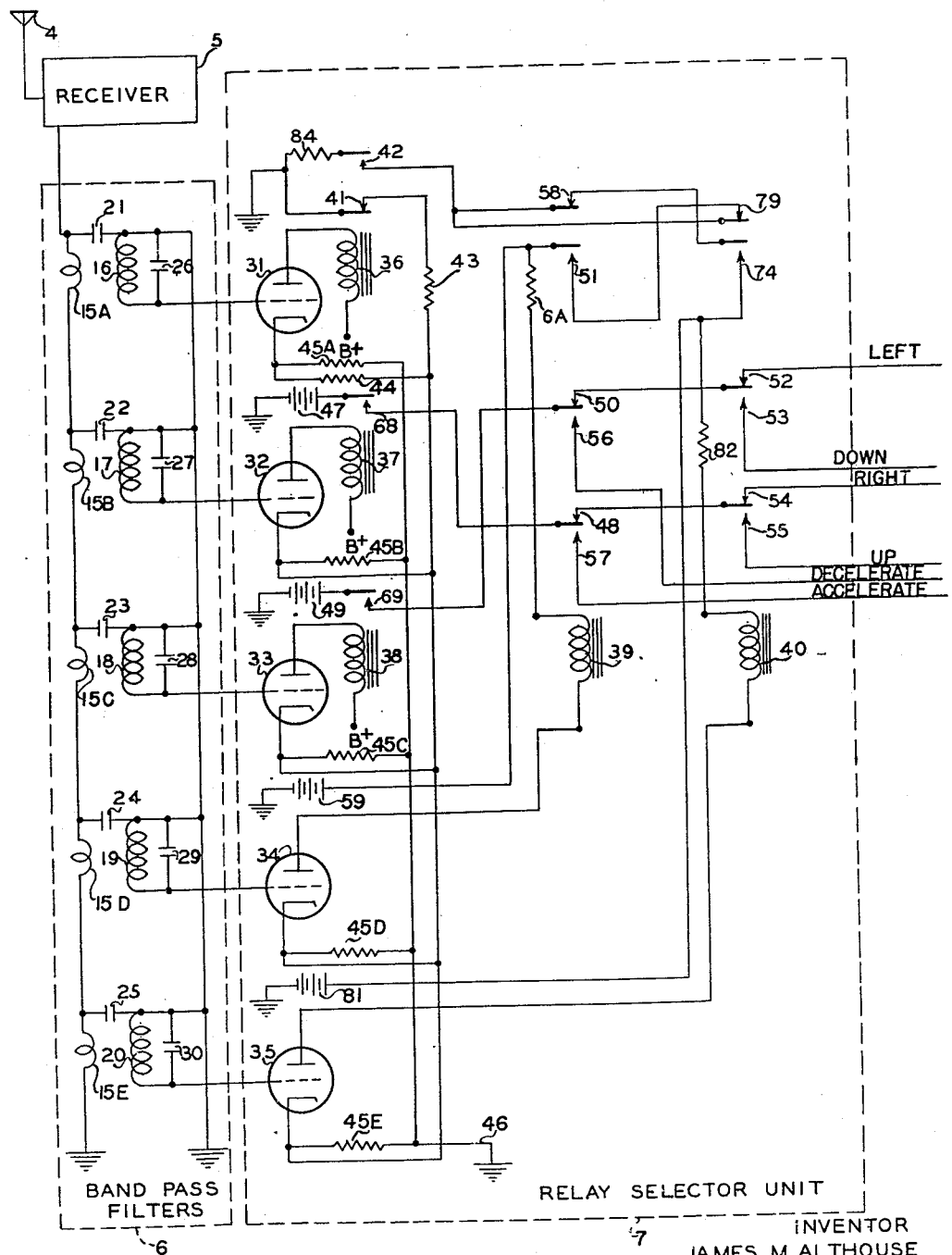
Fig. 2 is a schematic diagram of the tuned band-pass filters and the relay selector unit which form a part of the controlled station, shown in Fig. 1.

The preferred circuit details of the filters 6 and of the relay selector unit 7 are shown in Fig. 2 of the accompanying drawings. A modified carrier that is emitted from the control station antenna 2 is intercepted by the receiving antenna 4 and is passed to the receiver 5. The output from the receiver 5 is passed to a desired plurality of series-connected transformer primary windings 15A, 15B, 15C, 15D, 15E, etc., that are grounded remote from the receiver 5. The transformer primary windings 15A–15E, inclusive, are inductively coupled to a corresponding plurality of transformer secondary windings 16–20, inclusive, with a corresponding plurality of high-pass capacitors 21–25, inclusive, connected therebetween, respectively, throughout. The transformer secondary windings 16–20, inclusive, are individually tuned to the reception of separate signals by being shunted individually by tuning capacitors 26–30, inclusive, and respectively, so that the associated pairs of transformer windings provide band-pass filters for channeling received signals.

The outputs from the band-pass filters of which the transformer secondary windings 16–20, inclusive, are parts, are passed to the grids of a corresponding plurality of selector tubes 31–35, inclusive, respectively. The selector tubes 31–35, inclusive, apply their outputs to a corresponding plurality of relay windings 36–40, inclusive, respectively. The relay winding 36 operates two relay contacts 41 and 42 to which a common ground is applied alternately upon the energization and deenergization of the relay winding 36. A resistor 84 is interposed between the contact 42 and ground. The relay winding 37 operates the contact 68. The relay winding 38 operates the contact 69. The relay winding 39 operates the contacts 48, 50, 51, 56, 57 and 58. The relay winding 40 operates the contacts 52, 53, 54, 55, 74 and 79.

The normally closed relay contact 41 applies a cathode bias through resistor 43 to the cathodes of all of the tubes 32–35, inclusive, and, in addition, through the resistor 43 and 44 to the cathode of the tube 31. The resistor 43 is connected in parallel with resistors 45B, 45C, 45D and 45E so that when there is no signal on tube 31, then the other tubes 32, 33, 34 and 35 are active. When signal is being applied to tube 31, then the other tubes 32, 33, 34 and 35 are inactive. Cathode bias for the tubes 31–35, inclusive, is developed across the resistors 45A–45E, respectively, that are connected to ground at all times through a common connecter 46. The cathode bias on tube 31 preferably is maintained constant at all times by making the resistance of the resistor 45A equal to the sum of the resistances of the resistors 43 and 44.

In the normal operation of the system signal is applied continuously to the selector tube 31 except momentarily when operative signals are applied to the tubes 32–35, inclusive.

When signal is applied to the grid of the tube 31, the tube conducts, the relay winding 36 is energized, opening contact 41 and closing contact 42. The opening of contact 41 removes the resistor 43 from the cathodes of the tubes 31, 32, 33, 34 and 35 and leaves only the resistors 45A, 45B, 45C, 45D and 45E, respectively, in circuit therewith thereby biasing below cutoff the tubes 32, 33, 34 and 35. The resistor 45A is of such value that the tube 31 continues to conduct so long as signal is applied to its grid. The frequency of the signal applied to the grid of the tube 31 may be referred to as a "knockout frequency" in that it prevents the operation of the remaining tubes 32, 33, 34 and 35 in response to the application of signal to the grid of tube 31 or makes it impossible to impress a false signal upon the grids of any of the tubes. The flight course of the aircraft is altered by stopping the signal to the tube 31 and sending a signal of a frequency to be applied to one of the tubes 32, 33, 34 or 35 for modifying the flight course of the aircraft during the short time that the signal to the tube 31 is stopped.

The closing of the relay contact 42 applies ground connection through resistor 84 to the contacts 58 and 79 that are controlled by the relay windings 39 and 40, respectively. Contact 58 when opened, due to energization of coil 39 makes it impossible for a circuit to be completed through contact 74. Also when contact 79 is open due to the energization of coil 40, contact 51 cannot complete the circuit. This makes it impossible to have a right and left or up and down signal to be given the control mechanisms simultaneously.

In the absence of signal on the grid of the tube 32 the relay winding 37 is deenergized and its contact 68 is open. Upon the application of signal to the grid of the tube 32 the relay winding 37 is energized. The energization of the relay winding 37 closes its contact 68 and applies the potential of a battery 47 through a normally closed contact 48 of the relay winding 39 to a normally closed contact 54 of the relay winding 40 which provides the potential from the relay selector unit 7 to the azimuth control 8, Figs. 1 and 3.

In the absence of signal on the grid of the tube 33, Fig. 2, the relay winding 38 is deenergized and its contact 69 remains open. Upon the application of signal to the grid of the tube 33 the relay winding 38 is energized. The energization of the relay winding 38 closes its contact 69 and thereby applies the potential of a battery 49 through a normally closed contact 50 of the relay winding 39 to a normally closed contact 52 of the relay winding 40 which provides potential from the relay selector unit or unit 7 to the azimuth control 8, Figs. 2 and 3.

In the absence of signal on the grid of the tube 34, Fig. 2, the relay winding 39 is deenergized. Upon the application of signal to the grid of the tube 34 the relay winding 39 is energized, the contacts 51, 56 and 57 are closed, and the contacts 58, 50 and 48 are opened. The closed contacts 56 and 57 are means for providing potential of batteries 47 and 49, respectively, of the relay selector unit 7 to an acceleration control, not shown. The making of the contact 51, however, provides a shunt path through resistor 84 to ground for the battery 59 that is connected permanently to apply positive potential through a resistor 6A and relay winding 39 to the plate of tube 34. This lowers the plate voltage on tube 34 simultaneously with increase in cathode bias when "knockout" frequency is applied to tube 31. This makes it impossible for spurious signals which might be detrimental to the successful operation of this part of the relay selector unit 7 in Fig. 2, to operate.

Figure 3:
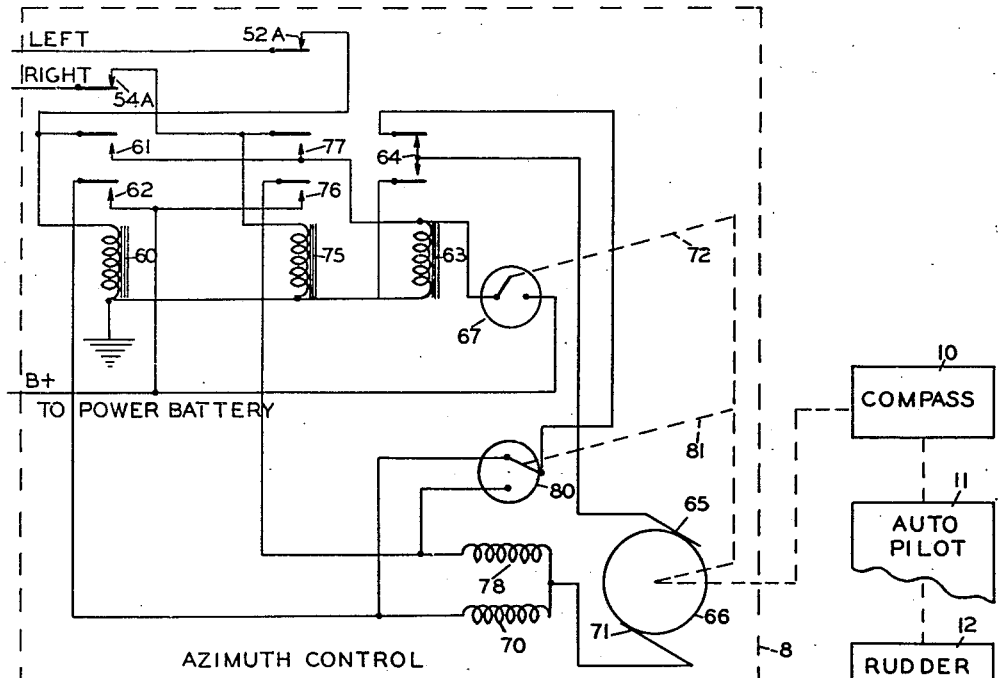
Fig. 3 is a schematic diagram of the azimuth control which forms a part of the controlled station shown in Fig. 1.
Figure 4:
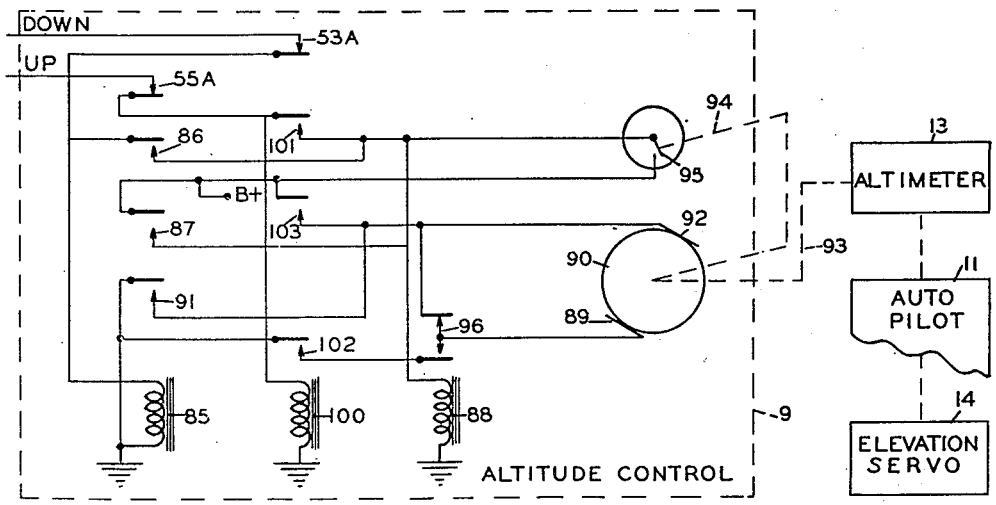
Fig. 4 is a schematic diagram of the altimeter control which forms a part of the controlled station shown in Fig. 1.

In the absence of signal on the grid of the tube 35 the relay winding 40 is deenergized. Upon the application of signal to the grid of the tube 35, the relay winding 40 is energized from the battery 81. The energization of the relay winding 40 opens contacts 52, 54 and 79 and closes contacts 53, 55 and 74. The contact 52 in the relay selector unit 7 (Fig. 2) is connected to contact 52A of the azimuth control 8 (Fig. 3). The contact 53 in the selector unit 7 is connected to contact 53A of the altimeter control 9 (Fig. 4). The contact 54 in the relay selector unit 7 is connected to contact 54A of the azimuth control 8 (Fig. 3). The contact 55 in the relay selector unit 7 is connected to contact 55A in the altimeter control 9 (Fig. 4). The battery 81 is connected permanently to apply positive potential to the plate of the tube 35 through a resistor 82 and the relay winding 40.

In the above described manner, when signals are intercepted by the receiving antenna 4 and are passed selectively to the tubes 31–35, inclusive, the signals individually and separately energize the relay windings 36–40, inclusive, respectively, and thereby actuate the relay contacts that are associated respectively therewith. As previously stated the outlets from the relay selector unit 7 are the azimuthal "Left" turn connected to contact 52, elevational "Down" connected to contact 53, azimuthal "Right" turn connected to contact 54, elevational "Up" connected to contact 55, velocity "Decelerate" connected to contact 56 and velocity "Accelerate" connected to contact 57. Additional relay contacts may be added to those shown for actuating additional controls upon the controlled aircraft, if desired, without departing from the scope of the present invention.

As previously mentioned contact 52 is connected to contact 52A of the azimuth control 8 that is shown in Fig. 3. Through these contacts when the necessary prerequisites are fulfilled, it is possible to energize a grounded relay winding 60 to open the "Right" turn contact 54A thereof and to close the other two contacts 61 and 62.

The closing of the relay contact 61 energizes the relay winding 63. The energization of the relay winding 63 causes the movable relay single-pole, double-throw switch 64 to be moved from its spring-pressed normal upwardly disposed position to its downwardly disposed position. In its down position it makes contact and grounds one commutator brush 65 contacting the motor armature 66.

The closing of the relay contact 62 applies B+ voltage to one motor field winding 70 and to commutator brush 71 that contacts the armature 66. Brush 65, it will be recalled, has been grounded by the closure of relay contact 61. The energization of the brush 71 and grounding of brush 65, as described, causes the armature 66 to rotate in one direction, say clockwise. The clockwise rotation of the armature 66 causes the rotation of the mounting of the compass 10 which "slaves" a directional gyroscope within the automatic pilot 11 and causes the rudder servo 12 to alter the flight course of the controlled aircraft in azimuth toward the left as long as the relay windings 60 and 63 continue to be energized.

"Slaving" a gyroscope is any process of applying an external force at right angles to the direction of the desired precession. Precession is the motion of the gyroscope at right angles to the direction of the applied external force in changing the orientation of the gyroscope axis.

The closing of the relay contact 61 also provides a holding circuit for relay 60 from the B+ source of direct-current potential through the movable arm of a single-pole, single-throw micro-switch 67. The switch 67 is operated mechanically from the motor armature 66 as by a cam riding on a shaft of the armature 66 or the like, and indicated by a dashed line 72 that extends therebetween.

The energization of the relay windings 60 and 63 is continued by this means to the end of one revolution of the operating cam indicated by the line 72. At the end of any one revolution of the armature 66 the operation of the cam indicated by the line 72 opens the micro-switch 67 and interrupts the circuit therethrough, deenergizing the relay windings 60 and 63 whereupon their respective contacts return to their preestablished positions.

When the rudder on the controlled aircraft has been turned toward the left a predetermined number of angular degrees, or for a predetermined period of time, the micro-switch 67 is opened in any desired manner, as by the cam indicated by the dashed line 72, or the like. Opening the micro-switch 67 deenergizes the relay windings 60 and 63, permitting the relay contacts 61 and 62 to open and permitting switch 64 to return to its spring-pressed upper position. The switch 67 may be opened in any other desired manner, but preferably by the cam indicated by the dashed line 72 and operated along with another mechanical connection 81 to a shorting switch 80 through a gear train (not shown) from the shaft of the motor on which the armature 66 is mounted.

The flight course of the controlled aircraft may be altered toward the right to a desired extent in a similar manner by causing a signal of proper frequency to be emitted from the control station 1 and to be admitted to the filter circuit through the band-pass filter of which the transformer secondary winding 17, Fig. 2, is a part. The passage of the signal through the transformer secondary winding 17 closes the contact of the relay winding 37 and energizes the relay winding 75 in the azimuth control 8, closing its contacts 76 and 77 and opening its contact 52A to the "Left" turn connection. The closing of the contact 76 energizes the motor field winding 78 from the B+ direct-current source, thereby causing the motor armature 66 to rotate counterclockwise and thereby turn the rudder of the controlled aircraft so that its flight course is altered toward the right. This result is accomplished since the closing of the relay contact 77 energizes the relay winding 63 and causes its switch 64 to apply ground to the commutator brush 65 and thereby complete the circuit through the motor field winding 78. The arrival of each signal admitted to the circuit through the transformer secondary winding 17 causes the controlled aircraft to turn toward the right a predetermined number of degrees or for a predetermined number of seconds. The effect of each signal terminates when the cam 72 opens the switch 67. The cam 72 opens the switch 67 after the motor rotor 66 has turned through a predetermined number of degrees. The motor armature 66 operates both the cam 72 and the mechanical connection 81 that closes the shorting switch 80 each time the cam 72 opens the micro-switch 67. The shorting switch 80 ties together in parallel the motor field windings 70 and 78 and rapidly brings the armature 66 to rest. The switch 80 when closed places the same voltage across both coils 70 and 78 so that the two fields cancel and there is no further driving torque on the motor.

Any coasting of the armature 66 causes the motor to act as a generator. The return of the contact 64 of the relay winding 63 to its normal closed upper position interrupts its ground connection and through the shorting switch 80 places the previously energized field winding 70 or 78 (depending on the direction of the armature rotation) in series with the armature 66, so that the rotation of the motor armature 66 is stopped rapidly and effectually.

The altimeter control 9 shown in Fig. 4 receives positive current input from the selector unit altitude "Down" connector 53 and from the selector unit altitude "Up" connector 55.

In the event that the elevation of the controlled aircraft is to be decreased, a pair of signals of proper frequencies to pass the windings 18 and 20 is emitted simultaneously from the control station 1. The signal through the winding 20 actuates the contacts of the relay winding 40, opening the contacts 79, 52, and 54 and closing contacts 74, 53 and 55. Upon closing of the contact connecting the "Down" connector 53 with the contact 50, voltage is applied thereto from battery 49 when signal, simultaneously passing the winding 18, energizes the relay winding 38 and closes its contact 69.

The energization of the "Down" connector 53 between the selector unit 7 and the altimeter control 9 energizes the winding of the relay 85, opening its contact with the "Up" connector 55 between the relay selector unit 7 and the altimeter control 9 and closing its other contacts 86, 87 and 91. The closing of the contact 86 energizes another relay winding 88, causing its double contact 96 to move toward the winding of the relay 88 and applying B+ voltage through the contact 87 and through the so engaged contact of the relay 88 to a commutator brush 89 that engages a motor armature 90 of a permanent magnet motor.

The contact 91 is also closed upon the energization of the relay winding 85 and applies ground to another commutator brush 92 that engages the motor armature 90. The permanent magnet motor, of which the armature 90 and brushes 89 and 92 are parts, is then energized and applies mechanical power through any desired means indicated by a dashed line 93, through the altimeter 13, automatic pilot 11, and elevator servo 14, to the elevators on the controlled aircraft.

The direction of rotation of the motor armature 90 is controlled by the relative polarity of the brushes 89 and 92 since motor 90 is of the permanent magnet field type. For example, it may be assumed that the motor armature 90 rotates in a clockwise direction where B+ power is applied to the brush 89, and ground is applied to the brush 92. It may be assumed further that the controlled aircraft is caused to descend for a predetermined period of time or unit distance with each application of one pair of signal impulses passed simultaneously by the windings 18 and 20. The sending from the control station 1 of additional simultaneous pairs of signals that are passed by the windings 18 and 20 cause the aircraft 3 to decrease its altitude to a desired additional extent.

The duration of each period of rotation of the armature 90 is terminated in any desired manner and preferably by suitable mechanical means, such as a cam driven by the motor shaft on which the armature 90 is mounted through a gear train, indicated by the dashed line 94 in Fig. 4 of the drawings, or the like. At the instant when the motor armature 90 begins to rotate, the mechanical means 94 closes a microswitch movable arm 95 against its contact, thereby, through the closed contact 86, applying B+ to the relay windings 85 and 88 by a new path and prolonging the energization of the relay windings 85 and 88 beyond the short period of time during which the received pair of signal impulses supply power through the "Down" connector 53. The power supply to armature 90 is also continued. The energization of the relay windings 85 and 88 continues to hold the contact 86 closed until the mechanical means 94 opens the switch 95, whereupon the energization of the relay windings 85 and 88 is interrupted and the contact 86 moves to its normal spring-pressed open position.

The deenergization of the relay winding 88 permits its double contact 96 to return to its normal spring-pressed upper position shown in Fig. 4 of the drawings, in which position it short-circuits the brushes 89 and 92 contacting the armature 90 and rapidly arrests the rotation thereof. Any coasting of the armature 90 causes the permanent magnet motor of which it is a part to act as a generator thereby affording an effectual electromagnetic brake which rapidly brings the armature 90 to rest. When the rotation of the motor armature 90 stops, the elevators on the controlled aircraft are returned automatically to their normal positions and the aircraft resumes its normal horizontal flight course.

In the event that it is desired that the elevation of the controlled aircraft is to be increased, simultaneous signals of proper predetermined frequencies to enter the windings 17 and 20 and energize the relay windings 37 and 40, respectively, are emitted from the control station 1. The closing of the contacts 68 and 55 that are operated by the relay windings so energized, cause a momentary surge of power to pass along the "Up" conductor from the selector unit 7 to the altimeter control 9 and to energize the winding of the relay 100 in the altimeter control 9, Fig. 4. The momentary energization of the relay winding 100 opens contact 53A and closes its other three contacts 101, 102 and 103.

The closing of the contact 101 of the relay winding 100 energizes the relay winding 88 from the battery 47. The energization of the relay winding 88 draws its contact 96 towards it and thereby applies ground to the brush 89 engaging the motor armature 90, through the closed contact 102 of the relay winding 100. The closing of the contact 103 of the relay winding 100 applies B+ power to the brush 92 whereupon the motor armature 90 rotates. The initial movement of the motor armature 90 closes the micro-switch movable arm 95 against its contact and prolongs the energization of the windings of the relays 88 and 100 beyond the power impulse initiated by the pair of signals. The B+ power that continues the energization of the windings of the relays 88 and 100 passes from the fixed micro-switch contact through the movable arm 95 thereof, through the relay winding 88 to ground and through the closed contact 101 and relay winding 100 to ground.

The permanent magnet motor, of which the armature 90 is a part, transfers mechanical energy through the mechanical connection 93 and through the altimeter 13, automatic pilot 11, and elevator servo 14 to move and hold the elevator on the controlled aircraft to its predetermined position for causing the aircraft to increase its altitude until the mechanical means 94 opens the micro-switch movable arm 95 away from its fixed contact to interrupt the B+ power supply and to deenergize the relay windings 88 and 100 and thus return the system to its normal state as shown in Fig. 4.

It is to be understood that the particular circuits, the components therein and the arrangements thereof in the circuits that are presented herein have been submitted for the purposes of illustrating and describing a satisfactorily operating embodiment of the present invention and that various modifications, changes and substitutions may be made therein without departing from the scope of the present invention.

What we claim is:

In a remote control radio system, a controlling transmitter for radiating radio energy at a plurality of predetermined frequencies, a receiver having a plurality of band-pass filters respectively resonant at said predetermined frequencies, electron discharge means so associated with each of said filters to become conductive upon the application of a signal from its respective filter, relay means adapted to be energized by said discharge means, a first of said relay means, operable in response to a signal of a first of said predetermined frequencies to prevent response by any other of said relay means to signals of any other of said predetermined frequencies, mechanical controlling means actuated by said relay means, and means responsive to movement of said controlling means for returning said relay and controlling means to their original positions after a predetermined time interval.

JAMES M. ALTHOUSE.
MARGARET A. McADAMS.

REFERENCES CITED

The following references are of record in the file of this patent:

UNITED STATES PATENTS

| Number | Name | Date |
|---|---|---|
| 1,597,416 | Mirick | Aug. 24, 1926 |
| 2,245,347 | Koch | June 10, 1941 |
| 2,282,102 | Tunick | May 5, 1942 |
| 2,325,829 | Boswau | Aug. 3, 1943 |
| 2,393,892 | De Ganahl | Jan. 29, 1946 |
| 2,396,091 | De Bey | Mar. 5, 1946 |
| 2,397,088 | Clay | Mar. 26, 1946 |
| 2,397,475 | Dinga | Apr. 2, 1946 |
| 2,397,477 | Kellogg | Apr. 2, 1946 |
| 2,414,103 | Hunter | Jan. 14, 1947 |